(12) United States Patent
Iyigun et al.

(10) Patent No.: US 8,990,441 B2
(45) Date of Patent: Mar. 24, 2015

(54) ASSIGNING PRIORITIES TO DATA FOR HYBRID DRIVES

(71) Applicant: Microsoft Corporation, Redmond, CA (US)

(72) Inventors: Mehmet Iyigun, Kirkland, WA (US); Yevgeniy M. Bak, Redmond, WA (US); Eric M. Bluestein, Seattle, WA (US); Robin A. Alexander, Woodinville, WA (US); Andrew M. Herron, Redmond, WA (US); Xiaozhong Xing, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/320,232

(22) Filed: Jun. 30, 2014

(65) Prior Publication Data

US 2014/0317317 A1 Oct. 23, 2014

Related U.S. Application Data

(63) Continuation of application No. 13/830,445, filed on Mar. 14, 2013, now Pat. No. 8,812,744.

(51) Int. Cl.
*G06F 3/06* (2006.01)
*G06F 5/00* (2006.01)

(52) U.S. Cl.
CPC .............. *G06F 3/061* (2013.01); *G06F 3/0608* (2013.01); *G06F 3/0611* (2013.01); *G06F 3/064* (2013.01); *G06F 3/0653* (2013.01);
(Continued)

(58) Field of Classification Search
None
See application file for complete search history.

(56) References Cited

U.S. PATENT DOCUMENTS

| 4,815,028 A | 3/1989 | Saitoh |
| 5,123,104 A | 6/1992 | Levine et al. |

(Continued)

FOREIGN PATENT DOCUMENTS

| BR | PI0711731 | 11/2011 |
| CN | 1967504 | 5/2007 |

(Continued)

OTHER PUBLICATIONS

"Final Office Action", U.S. Appl. No. 11/449,435, Dec. 4, 2008, 6 Pages.

(Continued)

*Primary Examiner* — Scott Sun
(74) *Attorney, Agent, or Firm* — Henry Gabryjelski; Kate Drakos; Micky Minhas

(57) ABSTRACT

A hybrid drive includes multiple parts: a performance part (e.g., a flash memory device) and a base part (e.g., a magnetic or other rotational disk drive). A drive access system, which is typically part of an operating system of a computing device, issues input/output (I/O) commands to the hybrid drive to store data to and retrieve data from the hybrid drive. The drive access system assigns, based on various available information, a priority level to groups of data identified by logical block addresses (LBAs). With each I/O command, the drive access system includes an indication of the priority level of the LBA(s) associated with the I/O command. The hybrid drive determines, based on the priority level indications received from the drive access system, which LBAs are stored on which part or parts of the hybrid drive.

20 Claims, 6 Drawing Sheets

(52) U.S. Cl.
CPC ........... *G06F 3/0685* (2013.01); *G06F 3/0659* (2013.01); *G06F 3/068* (2013.01)
USPC .............. 710/5; 710/2; 710/8; 710/11; 710/15

(56) References Cited

U.S. PATENT DOCUMENTS

| | | | |
|---|---|---|---|
| 5,307,497 A | 4/1994 | Feigenbaum et al. |
| 5,412,612 A | 5/1995 | Oyama |
| 5,420,998 A | 5/1995 | Horning |
| 5,475,827 A | 12/1995 | Lee et al. |
| 5,530,828 A | 6/1996 | Kaki et al. |
| 5,535,357 A | 7/1996 | Moran et al. |
| 5,581,505 A | 12/1996 | Lee |
| 5,592,630 A | 1/1997 | Yamagami et al. |
| 5,598,370 A | 1/1997 | Niijima et al. |
| 5,627,533 A | 5/1997 | Clark |
| 5,630,093 A | 5/1997 | Holzhammer et al. |
| 5,634,050 A | 5/1997 | Krueger et al. |
| 5,663,901 A | 9/1997 | Wallace et al. |
| 5,672,533 A | 9/1997 | Arima et al. |
| 5,682,497 A | 10/1997 | Robinson |
| 5,701,433 A | 12/1997 | Moriarty et al. |
| 5,734,816 A | 3/1998 | Niijima et al. |
| 5,745,418 A | 4/1998 | Ma et al. |
| 5,799,168 A | 8/1998 | Ban |
| 5,799,305 A | 8/1998 | Bortvedt et al. |
| 5,801,650 A | 9/1998 | Nakayama |
| 5,813,038 A | 9/1998 | Thome et al. |
| 5,822,781 A | 10/1998 | Wells et al. |
| 5,860,083 A | 1/1999 | Sukegawa |
| 5,867,417 A | 2/1999 | Wallace et al. |
| 5,867,641 A | 2/1999 | Jenett |
| 5,887,198 A | 3/1999 | Houlberg et al. |
| 5,912,848 A | 6/1999 | Bothwell |
| 5,937,425 A | 8/1999 | Ban |
| 5,956,473 A | 9/1999 | Ma et al. |
| 5,960,434 A | 9/1999 | Schimmel |
| 5,973,609 A | 10/1999 | Schoch |
| 5,973,964 A | 10/1999 | Tobita et al. |
| 5,974,426 A | 10/1999 | Lee et al. |
| 5,974,546 A | 10/1999 | Anderson |
| 5,987,563 A | 11/1999 | Itoh et al. |
| 5,991,778 A | 11/1999 | Starek et al. |
| 6,000,006 A | 12/1999 | Bruce et al. |
| 6,011,741 A | 1/2000 | Wallace et al. |
| 6,014,724 A | 1/2000 | Jenett |
| 6,018,433 A | 1/2000 | Thayne et al. |
| 6,018,806 A | 1/2000 | Cortopassi et al. |
| 6,061,788 A | 5/2000 | Reynaud et al. |
| 6,070,174 A | 5/2000 | Starek et al. |
| 6,073,232 A | 6/2000 | Kroeker et al. |
| 6,078,999 A | 6/2000 | Raju et al. |
| 6,101,601 A | 8/2000 | Matthews et al. |
| 6,111,815 A | 8/2000 | TaKeda |
| 6,122,745 A | 9/2000 | Wong-Insley |
| 6,148,349 A | 11/2000 | Chow et al. |
| 6,192,488 B1 | 2/2001 | Li |
| 6,198,660 B1 | 3/2001 | Rolandi |
| 6,208,581 B1 | 3/2001 | You |
| 6,209,088 B1 | 3/2001 | Reneris |
| 6,223,284 B1 | 4/2001 | Novoa et al. |
| 6,230,285 B1 | 5/2001 | Sadowsky et al. |
| 6,253,281 B1 | 6/2001 | Hall |
| 6,279,069 B1 | 8/2001 | Robinson et al. |
| 6,308,265 B1 | 10/2001 | Miller |
| 6,321,234 B1 | 11/2001 | Debrunner |
| 6,336,158 B1 | 1/2002 | Martwi |
| 6,347,051 B2 | 2/2002 | Yamagami et al. |
| 6,366,530 B1 | 4/2002 | Sluiter et al. |
| 6,377,500 B1 | 4/2002 | Fujimoto et al. |
| 6,380,581 B1 | 4/2002 | Noble et al. |
| 6,415,350 B2 | 7/2002 | Asoh |
| 6,418,506 B1 | 7/2002 | Pashley et al. |
| 6,438,750 B1 | 8/2002 | Anderson |
| 6,456,517 B2 | 9/2002 | Kim et al. |
| 6,493,807 B1 | 12/2002 | Martwick |
| 6,496,854 B1 | 12/2002 | Hagersten et al. |
| 6,510,488 B2 | 1/2003 | Lasser |
| 6,539,456 B2 | 3/2003 | Stewart |
| 6,564,285 B1 | 5/2003 | Mills et al. |
| 6,606,707 B1 | 8/2003 | Hirota et al. |
| 6,621,746 B1 | 9/2003 | Aasheim et al. |
| 6,628,537 B1 | 9/2003 | Wallace et al. |
| 6,633,956 B1 | 10/2003 | Mitani |
| 6,643,730 B2 | 11/2003 | Okumura et al. |
| 6,670,234 B2 | 12/2003 | Hsu et al. |
| 6,799,231 B2 | 9/2004 | Hsin et al. |
| 6,804,146 B2 | 10/2004 | Johnson |
| 6,839,823 B1 | 1/2005 | See et al. |
| 6,850,995 B1 | 2/2005 | Shishizuka et al. |
| 6,859,068 B1 | 2/2005 | Trivedi et al. |
| 6,892,270 B2 | 5/2005 | Roohparvar |
| 6,901,499 B2 | 5/2005 | Aasheim et al. |
| 6,910,106 B2 | 6/2005 | Sechrest et al. |
| 6,928,512 B2 | 8/2005 | Ayukawa et al. |
| 7,010,662 B2 | 3/2006 | Aasheim et al. |
| 7,017,037 B2 | 3/2006 | Fortin et al. |
| 7,062,618 B2 | 6/2006 | Tsunoda et al. |
| 7,082,512 B2 | 7/2006 | Aasheim et al. |
| 7,093,101 B2 | 8/2006 | Aasheim et al. |
| 7,100,040 B2 | 8/2006 | Fortin et al. |
| 7,107,444 B2 | 9/2006 | Fortin et al. |
| 7,110,437 B2 | 9/2006 | Oates et al. |
| 7,162,549 B2 | 1/2007 | Mambakkam et al. |
| 7,185,155 B2 | 2/2007 | Sechrest et al. |
| 7,186,147 B1 | 3/2007 | Chou et al. |
| 7,203,830 B2 | 4/2007 | Fortin et al. |
| 7,360,022 B2 | 4/2008 | Tian et al. |
| 7,613,880 B2 | 11/2009 | Miura et al. |
| 7,698,513 B2 | 4/2010 | Sechrest et al. |
| 7,716,411 B2 | 5/2010 | Panabaker et al. |
| 8,082,384 B2 | 12/2011 | Sareen et al. |
| 8,151,064 B2 | 4/2012 | Lee |
| 8,195,878 B2 | 6/2012 | Mittendorff et al. |
| 8,307,014 B2 | 11/2012 | Mehrotra et al. |
| 8,423,700 B2 | 4/2013 | Panabaker et al. |
| 8,473,670 B2 | 6/2013 | Sareen et al. |
| 8,812,744 B1 | 8/2014 | Iyigun et al. |
| 2003/0165076 A1 | 9/2003 | Gorobets et al. |
| 2003/0177305 A1 | 9/2003 | Hetrick |
| 2003/0206478 A1 | 11/2003 | Ayukawa et al. |
| 2003/0212857 A1 | 11/2003 | Pacheco et al. |
| 2004/0083405 A1 | 4/2004 | Chang et al. |
| 2004/0093463 A1 | 5/2004 | Shang |
| 2005/0027928 A1 | 2/2005 | Avraham et al. |
| 2005/0036387 A1 | 2/2005 | Seal et al. |
| 2005/0044348 A1 | 2/2005 | O'Connell |
| 2005/0102444 A1 | 5/2005 | Cruz |
| 2005/0128853 A1 | 6/2005 | Ayukawa et al. |
| 2005/0138271 A1 | 6/2005 | Bernstein et al. |
| 2005/0182893 A1 | 8/2005 | Suh |
| 2005/0204091 A1 | 9/2005 | Kilbuck et al. |
| 2006/0004971 A1 | 1/2006 | Kim et al. |
| 2006/0031710 A1 | 2/2006 | Jo |
| 2006/0075284 A1 | 4/2006 | Skan et al. |
| 2006/0109725 A1 | 5/2006 | Yoon et al. |
| 2006/0184710 A1 | 8/2006 | Valdivia et al. |
| 2006/0239075 A1 | 10/2006 | Williams et al. |
| 2006/0291304 A1 | 12/2006 | Rothman et al. |
| 2006/0294295 A1 | 12/2006 | Fukuzo |
| 2007/0050536 A1 | 3/2007 | Kolokowsky |
| 2007/0288683 A1 | 12/2007 | Panabaker et al. |
| 2007/0300008 A1 | 12/2007 | Rogers et al. |
| 2008/0082736 A1 | 4/2008 | Chow et al. |
| 2009/0089343 A1 | 4/2009 | Moore et al. |
| 2009/0100215 A1 | 4/2009 | Nochimowski |
| 2009/0106484 A1 | 4/2009 | Yeh et al. |
| 2009/0249052 A1 | 10/2009 | Sareen |
| 2010/0082879 A1 | 4/2010 | Mckean |
| 2010/0138677 A1 | 6/2010 | Pagan et al. |
| 2010/0217924 A1 | 8/2010 | Panabaker et al. |
| 2010/0268866 A1 | 10/2010 | Colligan |
| 2010/0268874 A1* | 10/2010 | Pyeon .......................... 711/112 |
| 2011/0138106 A1 | 6/2011 | Prabhakaran et al. |

(56) References Cited

U.S. PATENT DOCUMENTS

| | | | |
|---|---|---|---|
| 2012/0047323 | A1 | 2/2012 | Sareen |
| 2012/0054248 | A1* | 3/2012 | Mehrotra et al. ............ 707/803 |
| 2012/0233386 | A1 | 9/2012 | Tong et al. |
| 2012/0239859 | A1 | 9/2012 | Lary et al. |
| 2012/0290774 | A1 | 11/2012 | Trika |
| 2012/0317337 | A1 | 12/2012 | Johar et al. |
| 2014/0325166 | A1 | 10/2014 | Iyigun et al. |
| 2014/0325169 | A1 | 10/2014 | Iyigun et al. |

FOREIGN PATENT DOCUMENTS

| | | |
|---|---|---|
| CN | 101473438 | 7/2009 |
| CN | 102388358 | 3/2012 |
| EP | 0566306 | 10/1993 |
| GB | 2291991 | 2/1996 |
| JP | 2001142774 | 5/2001 |
| JP | 2001510612 | 7/2001 |
| JP | 2001338468 | 12/2001 |
| JP | 2001344967 | 12/2001 |
| JP | 2002259443 | 9/2002 |
| JP | 2003036204 | 2/2003 |
| JP | 2003091463 | 3/2003 |
| JP | 2009540431 | 11/2009 |
| JP | 2011181098 | 9/2011 |
| JP | 5613103 | 9/2014 |
| KR | 20090026276 | 3/2009 |
| KR | 101159400 | 6/2012 |
| MX | 2008014859 | 12/2008 |
| RU | 2008148129 | 6/2010 |
| TW | 200745848 | 12/2007 |
| WO | WO-97/37296 | 10/1997 |
| WO | WO-2004049168 | 6/2004 |
| WO | WO-2005062309 | 7/2005 |
| WO | WO-2006060670 | 6/2006 |
| WO | WO-2008131058 | 10/2008 |
| WO | WO-2009120423 | 10/2009 |

OTHER PUBLICATIONS

"Final Office Action", U.S. Appl. No. 12/055,315, Jun. 24, 2011, 6 pages.
"Final Office Action", U.S. Appl. No. 13/287,344, Nov. 7, 2012, 10 pages.
"Final Rejection", JP Application No. 2009-514323, Jan. 14, 2011, 4 pages.
"Foreign Notice of Allowance", CN Application No. 200780021218.3, Jan. 20, 2012, 4 pages.
"Foreign Notice of Allowance", JP Application No. 2011-111408, Aug. 7, 2014, 4 Pages.
"Foreign Notice of Allowance", Mexican Application No. PA/a/2012/002259, Jun. 28, 2013, 4 pages.
"Foreign Notice of Allowance", RU Application No. 2008148129, Aug. 11, 2011, 24 pages.
"Foreign Notice of Allowance", TW Application No. 96113112, Sep. 3, 2013, 4 pages.
"Foreign Office Action", CN Application No. 200780021218.3, Jan. 29, 2010, 9 pages.
"Foreign Office Action", CN Application No. 200780021218.3, May 3, 2011, 8 pages.
"Foreign Office Action", CN Application No. 200980111459.6, Oct. 10, 2012, 9 pages.
"Foreign Office Action", EP Application No. 07795704.1, Apr. 15, 2011, 4 pages.
"Foreign Office Action", JP Application No. 2009-514323, May 14, 2010, 13 pages.
"Foreign Office Action", JP Application No. 2011-111408, Apr. 2, 2014, 4 Pages.
"Foreign Office Action", JP Application No. 2011-111408, Aug. 27, 2013, 4 pages.
"Foreign Office Action", JP Application No. 2011-111408, Dec. 18, 2012, 8 pages.

"Foreign Office Action", RU Application No. 2008148129, May 18, 2011, 7 pages.
"Foreign Office Action", TW Application No. 096113112, May 22, 2013, 6 pages.
"International Search Report and Written Opinion", Application No. PCT/US2014/020954, May 22, 2014, 8 pages.
"International Search Report and Written Opinion", Application No. PCT/US2013/058840, Oct. 31, 2013, 8 pages.
"International Search Report", Application No. PCT/US2009/034199, Oct. 1, 2009, 3 pages.
"Micron Technology Announces Syncflash TM Memory, A New Flash Memory Technology.", retrieved from <http://www.micron.com/news/product/1999-11-16197.htms?print_yes, Nov. 22, 1999, 2 pages.
"Non Final Office Action", U.S. Appl. No. 10/186,164, Jun. 7, 2005, 5 Pages.
"Non Final Office Action", U.S. Appl. No. 10/301,800, Jun. 13, 2005, 12 Pages.
"Non Final Office Action", U.S. Appl. No. 11/204,573, Dec. 20, 2005, 8 Pages.
"Non Final Office Action", U.S. Appl. No. 11/204,684, Aug. 18, 2006, 9 Pages.
"Non Final Office Action", U.S. Appl. No. 11/204,705, Feb. 17, 2006, 16 Pages.
"Non Final Office Action", U.S. Appl. No. 11/267,097, Mar. 22, 2006, 7 Pages.
"Non Final Office Action", U.S. Appl. No. 11/267,362, Mar. 22, 2006, 6 Pages.
"Non Final Office Action", U.S. Appl. No. 11/449,435, Jan. 28, 2008, 8 Pages.
"Non Final Office Action", U.S. Appl. No. 11/449,435, May 26, 2009, 8 Pages.
"Non Final Office Action", U.S. Appl. No. 12/055,315, Mar. 7, 2011, 9 pages.
"Non-Final Office Action", U.S. Appl. No. 13/287,344, Apr. 27, 2012, 11 pages.
"Notice of Allowance", U.S. Appl. No. 10/186,164, Oct. 4, 2005, 11 Pages.
"Notice of Allowance", U.S. Appl. No. 10/301,800, Sep. 6, 2005, 11 Pages.
"Notice of Allowance", U.S. Appl. No. 11/204,573, May 12, 2006, 7 Pages.
"Notice of Allowance", U.S. Appl. No. 11/204,684, Nov. 27, 2006, 4 pages.
"Notice of Allowance", U.S. Appl. No. 11/204,705, Jun. 22, 2006, 6 Pages.
"Notice of Allowance", U.S. Appl. No. 11/267,097, Apr. 24, 2006, 5 Pages.
"Notice of Allowance", U.S. Appl. No. 11/267,362, Apr. 24, 2006, 6 Pages.
"Notice of Allowance", U.S. Appl. No. 11/449,435, Jan. 26, 2010, 7 Pages.
"Notice of Allowance", U.S. Appl. No. 12/055,315, Aug. 16, 2011, 8 pages.
"Notice of Allowance", U.S. Appl. No. 12/771,670, Jan. 7, 2013, 8 Pages.
"Notice of Allowance", U.S. Appl. No. 13/287,344, Jan. 30, 2013, 7 pages.
"Notice of Allowance", U.S. Appl. No. 13/830,445, Mar. 26, 2014, 7 pages.
"SSD Performance, HDD Capacity, Affordable Price", Retrieved from <http://www.seagate.com/internal-hard-drives/laptop-hard-drives/momentus-xt-hybrid/> on Feb. 5, 2013, Nov. 2012, 2 pages.
"Supplementary European Search Report", EP Application No. 07795704.1, Jun. 30, 2010, 9 pages.
"WD® Creates World's Thinnest 2.5-inch Hybrid Hard Drive", Retrieved from <http://www.prnewswire.com/news-releases/wd-creates-worlds-thinnest-25-inch-hybrid-hard-drive-169157916.html> on Feb. 5, 2013, Sep. 10, 2012, 2 pages.
"Wear Leveling", Available at <http://www.storagreview.com/guide/featuresLeveling.html>, May 16, 2007, 2 pages.
"Written Opinion", PCT/US2009/034199, Oct. 1, 2009, 3 pages.

(56) References Cited

OTHER PUBLICATIONS

Baggett, "DOS Stamp User's Manual", Retrieved from http://www.bagotronix.com/stmpman.pdf on Aug 11, 2009, Feb. 16, 2001, p. 19.
Chen, et al., "Hystor: Making the Best Use of Solid State Drives in High Performance Storage Systems", Proceedings of the 25th International Conference on Supercomputing, Available at <http://www.cse.ohio-state.edu/~fchen/paper/papers/ics11.pdf >, May 31, 2011, 11 pages.
Jex, "Flash Memory Bios for PC and Notebook Computers", Communications, Computers and Signal Processing, 1991., IEEE Pacific Rim Conference, May 9, 1991, p. 692-695.
Joo, et al., "FAST: Quick Application Launch on Solid-State Drives", Proceedings of the 9th USENIX Conference on File and Storage Technologies, Available at <http://static.usenix.org/event/fast11/tech/full_papers/Joo.pdf>, Feb. 15, 2011, 14 pages.
Li, et al., "An Efficient SSD-based Hybrid Storage Architecture for Large-Scale Search Engines", Proceedings of 41st International Conference on Parallel Processing (ICPP), Available at <http://idc.hust.edu.cn/~rxli/publications/2012/ICPP12_SSD-IR-Cache.pdf>, Sep. 10, 2012, 10 pages.
Pnevmatikatos, et al., "On Using Network RAM as a non-volatile Buffer", Retrieved from http://dcs.ics.forth.gr/Activities/papers/TR.pdf, Aug. 1998, 14 pages.
Rosenblum, et al., "The Design and Implementation of a Log-Structured File System", Electrical Engineering and Computer Sciences, Computer Science Division, University of California, Berkeley, CA, 1991, 15 pages.
Sandisk, "DiskOnChip 2000 DIP from 16MByte to 1GByte", Data Sheet, Mar. 2006, pp. 1-29.
Saxena, et al., "FlashTier: A Lightweight, Consistent and Durable Storage Cache", Proceedings of the 7th ACM European conference on Computer Systems, Available at <http://pages.cs.wisc.edu/~swift/papers/eurosys12_flashtier.pdf >, Apr. 10, 2012, 14 pages.
"Non-Final Office Action", U.S. Appl. No. 10/087,251, Jun. 3, 2005, 14 pages.
"Foreign Notice of Allowance", CN Application No. 200980111459.6, Mar. 27, 2013, 6 pages.
"Notice of Allowance", U.S. Appl. No. 10/087,251, Apr. 24, 2006, 6 Pages.
"Notice of Allowance", U.S. Appl. No. 10/087,251, Nov. 14, 2005, 6 Pages.
"Notice of Allowance", U.S. Appl. No. 10/372,734, Mar. 14, 2006, 6 Pages.
"Written Opinion", Application No. PCT/US2014/020954, Oct. 6, 2014, 6 Pages.
"Bitmap Index", Wikipedia, the free encyclopedia, Oct. 3, 2012, Retrieved from the Internet Sep. 25, 2014: URL:http://en.wikipedia.org/w/index.php?title= Bitmapindex&oldid=515775572, Oct. 3, 2012, 7 Pages.
"Run-length encoding", Wikipedia, the free encyclopedia, Feb. 28, 2013, Retrieved from the Internet on Sep. 25, 2014 URL:http://en.wikipedia.org/w/index.php?title=Run-length_encoding &oldid=541291392, Feb. 28, 2013, 3 Pages.

* cited by examiner

300

400

ASSIGNING PRIORITIES TO DATA FOR HYBRID DRIVES

RELATED APPLICATIONS

This application is a continuation of U.S. patent application Ser. No. 13/830,445, filed Mar. 14, 2013, entitled "Assigning Priorities To Data For Hybrid Drives" to Mehmet Iyigun et al., the entire disclosure of which is hereby incorporated by reference herein in its entirety.

BACKGROUND

Computers have traditionally had storage devices on which data such as program instructions and user data can be stored. As technology has advanced, these storage devices have included magnetic floppy disks, magnetic hard disks, solid state drives (e.g., flash memory drives), and so forth. Some hybrid drives have also been developed that include both a larger capacity (but less expensive) hard drive and a smaller capacity (but more expensive) flash memory drive. Although such hybrid drives can be beneficial they are not without their problems. One such problem is that it remains difficult to determine which data is to be stored on the flash memory drive of the hybrid drive. A poor determination as to which data to store on the flash memory drive can lead to little if any performance improvement of the hybrid drive over a traditional magnetic media hard drive, resulting in user frustration due to the lack of performance improvement despite the higher cost of the hybrid drive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, information describing accesses to multiple groups of data stored in a hybrid drive is obtained. The hybrid drive includes both a performance part and a base part in which the groups of data can be stored. An indication of a priority level of a group of data accessed by an input/output (I/O) command is communicated with the I/O command issued to the hybrid drive. The priority level provides an indication to the hybrid drive whether the hybrid drive is expected but not obligated to store the group of data in the performance part, the priority level having been assigned to the group of data based on the information describing accesses to multiple groups of data stored in the hybrid drive.

In accordance with one or more aspects, information describing accesses to multiple groups of data stored in a hybrid drive is obtained. The hybrid drive includes both a performance part and a base part in which the groups of data can be stored. An indication of a priority level of a group of data accessed by an input/output (I/O) command is communicated with the I/O command issued to the hybrid drive. The priority level indicates to the hybrid drive whether the hybrid drive is expected to store the group of data in the performance part, the priority level having been assigned to the group of data based on the information.

In accordance with one or more aspects, information describing accesses to multiple groups of data stored in a hybrid drive is obtained. The hybrid drive including both a performance part and a base part in which the groups of data can be stored. An indication of a priority level of a group of data accessed by an input/output (I/O) command is communicated with the I/O command issued from an operating system to the hybrid drive. The priority level provides an indication to the hybrid drive whether the hybrid drive is expected to store the group of data in the performance part but the operating system has no knowledge of whether the group of data is stored in the performance part, the priority level having been assigned to the group of data based on the information.

BRIEF DESCRIPTION OF THE DRAWINGS

The same numbers are used throughout the drawings to reference like features.

DETAILED DESCRIPTION

Assigning priorities to data for hybrid drives is discussed herein. A hybrid drive includes multiple parts: a performance part (e.g., a flash memory device) and a base part (e.g., a hard disk drive). A drive access system, which is typically part of an operating system of a computing device, issues input/output (I/O) commands to the hybrid drive to store data to and retrieve data from the hybrid drive. The drive access system assigns a priority level to groups of data identified by logical block addresses (LBAs) based on various information available to the drive access system. With each I/O command, the drive access system can include an indication of the priority level of the LBA(s) associated with the I/O command. The hybrid drive determines, based at least in part on the priority level indications received from the drive access system, which LBAs are to be stored on which part or parts of the hybrid drive.

Priority levels are assigned to LBAs lazily over time, referring to the priority levels being communicated to the hybrid drive as the LBAs are accessed. The priority level of an LBA is a hint or indication to the hybrid drive of how important or desirable it is to the drive access system to have the data of the LBA stored in the performance part. The hybrid drive is expected to honor the relative priorities assigned to the LBAs when making various policy decisions regarding which data is to be stored in the performance part. The hybrid drive is expected to store data for LBAs assigned a particular priority level in the base part as long as there are pages at that same priority level or a lower priority level in the performance part.

Figure 1:
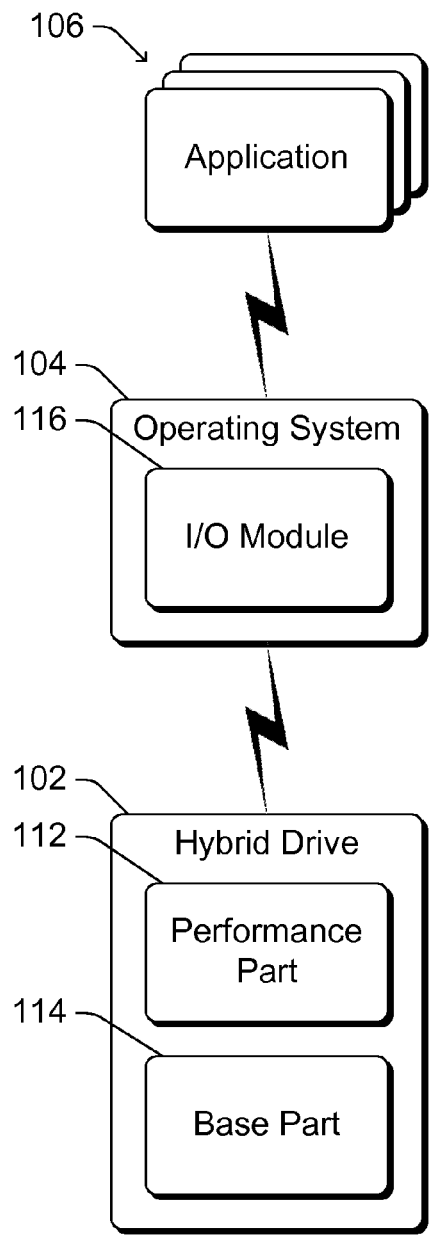
FIG. 1 illustrates an example system implementing the assigning priorities to data for hybrid drives in accordance with one or more embodiments.

FIG. 1 illustrates an example system 100 implementing the assigning priorities to data for hybrid drives in accordance with one or more embodiments. System 100 includes a hybrid drive 102, an operating system 104, and one or more applications 106. Hybrid drive 102 can be implemented in different manners, such as a fixed drive in a computing device, a removable device coupled to a computing device (e.g., via a Universal Serial Bus (USB) connection), and so forth.

In one or more embodiments, system 100 is implemented on a single computing device. System 100 can be implemented on a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, system 100 can be implemented on computing devices ranging from full resource devices with substantial memory and processor resources (e.g., personal computers, game consoles) to low-resource devices with limited memory and/or processing resources (e.g., traditional set-top boxes, hand-held game consoles).

Alternatively, system 100 can be implemented on multiple different devices. For example, operating system 104 and applications 106 can be implemented on one device (e.g., any of a variety of different types of computing devices as discussed above) and hybrid drive 102 can be implemented as a separate device. When implemented separately, the device implementing operating system 104 can communicate with hybrid drive 102 in different manners, such as via a wired and/or wireless connection (e.g., via a USB or wireless USB connection), via a network (e.g., via a local area network (LAN) or a personal area network (PAN)), and so forth.

Hybrid drive 102 includes two parts: a performance part 112 and a base part 114. Performance part 112 is a higher performance part than base part 114. The performance of parts 112 and 114 can refer to various different characteristics of the parts 112 and 114, such as the speed of the parts (e.g., the rate at which information can be read from and/or written to the parts) and/or the power consumption of the parts (e.g., the amount of power consumed by the parts when active and able to be read from and/or written to). Performance part 112 is faster and/or has less power consumption than base part 114, and thus is referred to as a higher performance part than base part 114. However, performance part 112 typically costs more per unit of storage (e.g., per gigabyte) than base part 114. Thus, base part 114 typically has more storage capacity than performance part 112, also referred to as base part 114 being larger than performance part 112 or the size of base part 114 being larger than the size of performance part 112.

Performance part 112 and base part 114 can be implemented in different manners. In one or more embodiments, performance part 112 is a solid state device (e.g., a flash memory device) and base part 114 is rotational storage device (e.g., a magnetic hard disk drive). Alternatively, parts 112 and 114 can be implemented in other manners. For example, performance part 112 can be one type of solid state device (e.g., single-level cell (SLC) flash memory) and base part 114 can be another type of solid state device (e.g., multi-level cell (MLC) flash memory). By way of another example, one or both of parts 112 and 114 can be implemented using various other types of storage devices and technology, such as memristor memory technology, phase change memory technology, and so forth.

Although hybrid drive 102 includes multiple parts, hybrid drive 102 operates as a single storage drive from the perspective of operating system 104. The size (storage capacity) of hybrid drive 102 is the size of the larger of performance parts 112 and base part 114, which is typically base part 114 due to the lower cost per unit of storage of base part 114. Hybrid drive 102 is presented to operating system 104 as a single storage device—operating system 104 reads data from and writes data to hybrid drive 102 as if drive 102 were a single storage device. However, operating system 104 is aware that hybrid drive 102 includes multiple parts, and thus operating system 104 provides indications or hints to hybrid drive 102 as to the importance of various data to assist hybrid drive 102 in determining which part to store data in, as discussed in more detail below. Hybrid drive 102 can be presented to operating system 104 as a single storage device in various manners. For example, hybrid drive 102 can present itself to operating system 104 as a single storage device, hybrid drive 102 can be disparate devices that a hardware controller presents to operating system 104 as a single storage device, hybrid drive 102 can be multiple devices that a software driver running on the operating system 104 presents to operating system 104 as a single storage device, and so forth.

Operating system 104 includes an I/O module 116 that issues I/O commands to access hybrid drive 102, including commands to read data from hybrid drive 102 and commands to write data to hybrid drive 102. The commands to read and write data can be from other modules of operating system 104 as well as applications 106. As used herein, the data being read from and written to hybrid drive 102 includes any bits that are read from and/or written to hybrid drive 102—the data can include user data or program data, program instructions, binary code, and so forth.

Operating system 104 assigns priority levels to groups of logical block addresses (LBAs). An LBA is an address of a location on hybrid drive 102 where data is stored, and the data stored at that location is also referred to as the LBA data. The amount of data stored at a particular LBA can vary based on the manner in which hybrid drive 102 is implemented. The priority level assigned to a particular LBA is also be referred to as being assigned to the data stored at that particular LBA. Because the priority levels are assigned to groups of LBAs, the priority levels can also be referred to as being assigned to groups of data (that are identified by the LBAs).

Operating system 104 assigns priorities to LBAs at a granularity of groups of multiple LBAs (although operating system 104 could alternatively assign priorities at a granularity of the LBAs). Using a granularity of groups of multiple LBAs, the size of a group of LBAs can vary, such as being a collection of LBAs at which 16 kilobytes of data is stored or a collection of LBAs at which 64 kilobytes of data is stored. In one or more embodiments, each group of LBAs is a contiguous range of addresses. Alternatively, a group can include LBAs in other manners in which case LBAs in a group may not be a contiguous range of addresses. Priority levels for groups of LBAs are assigned based on various information available to operating system 104, such as information regarding the frequency with which LBAs in the group are accessed, information regarding events occurring during or preceding access to an LBA, and so forth as discussed in more detail below. An LBA is assigned the priority that is assigned to the group that includes the LBA, and all of the LBAs in the group are assigned the same priority.

For each I/O command issued to hybrid drive 102, I/O module 116 can include with the I/O command an indication of the priority level assigned to the LBA accessed by the I/O command. Although I/O module 116 can include an indication of the priority level assigned to the LBA accessed by the I/O command, I/O module 116 is not obligated to include the priority level and in some situations may not include a priority level.

The priority level assigned to an LBA can be maintained by hybrid drive 102 to facilitate management of LBAs in hybrid drive 102. The priority level is an indication of the perceived importance to operating system 104 of the data stored at the LBA (also referred to as the perceived importance of the LBA). Generally, the perceived importance of data refers to the speed at which access to the data is desired and/or the frequency with which the data is desired. Data to which fast access is desired (e.g., to improve the speed at which a computing device boots or launches an application) can be deemed to be of greater importance than data to which fast access is not as desirable. Furthermore, data that is accessed frequently can be deemed to be of greater importance than data that is accessed infrequently. Operating system 104 expects hybrid drive 102 to store data for LBAs (also referred to as storing the LBAs) in parts 112 and 114 based on their priority levels so that data at LBAs with higher priority levels are stored in performance part 112 (in addition to or rather than in base part 114). However, hybrid drive 102 is not bound or obligated to store data at LBAs of any particular priority level in performance part 112 and operating system 104 need not have, and typically does not have, knowledge of which of parts 112 and 114 data at a particular LBA is stored in. Which part data at a particular LBA is stored in is determined by hybrid drive 102 itself rather than operating system 104, although this determination is typically made by hybrid drive 102 based on the priority level indicated by I/O module 116.

It should be noted that although hybrid drive determines which of parts 112 and 114 particular LBA data is stored in based on the indications from operating system 104, hybrid drive 102 can include an additional one or more modules to determine which of parts 112 and 114 particular LBA data is stored in. For example, hybrid drive 102 itself can monitor I/O accesses and determine based at least in part on this monitoring which of parts 112 and 114 particular LBA data is stored in. Operating system 104 need not, and typically does not, have knowledge of such additional modules or monitoring by hybrid drive 102, and continues to provide indications of priority levels to hybrid drive 102 as discussed herein regardless of any such additional modules or monitoring of hybrid drive 102.

It should also be noted that, although hybrid drive 102 is illustrated with two parts 112 and 114, each of these parts can be made up of multiple components. For example, performance part 112 may be made up of multiple flash memory chips or a single flash memory chip. By way of another example, base part 114 may be made up of a single hard disk drive or multiple hard disk drives. These different components can all be implemented in the same device (e.g., the same drive enclosure) or alternatively be spread across multiple devices (e.g., multiple different enclosures) coupled to one another (e.g., via a USB or wireless USB connection, or via a network).

Furthermore, it should be noted that although hybrid drive 102 is discussed herein as including two parts, hybrid drive 102 can alternatively include three or more parts. For example, hybrid drive 102 may include a middle performance part that is a higher performance part than base part 114 but a lower performance part than performance part 112. Regardless of the number of parts, indications of priority levels of LBAs are provided to hybrid drive 102 by operating system 104, and hybrid drive 102 determines which part or parts to store the LBAs on based on these priority level indications.

Figure 2:
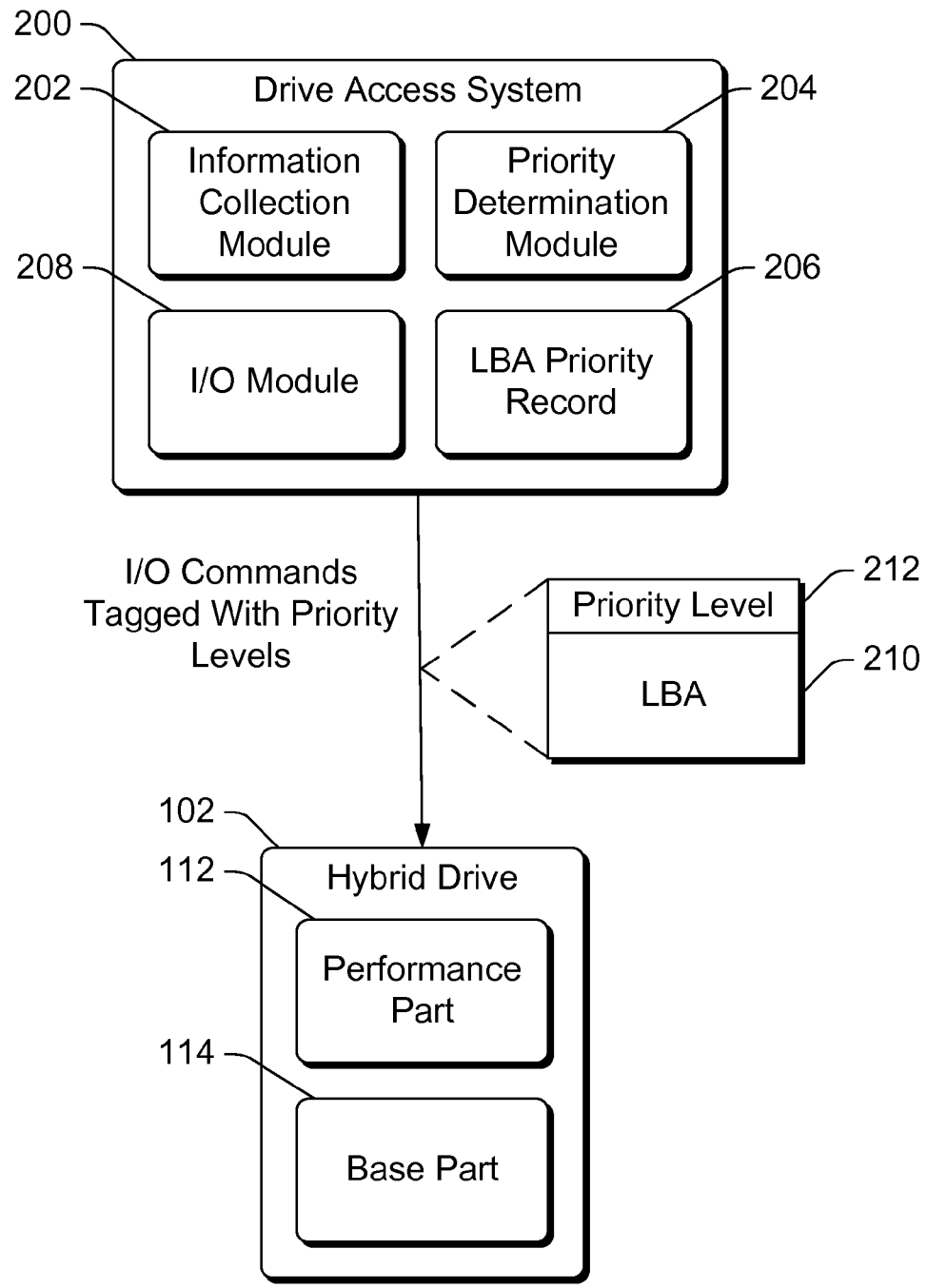
FIG. 2 illustrates an example drive access system in accordance with one or more embodiments.

FIG. 2 illustrates an example drive access system 200 in accordance with one or more embodiments. Drive access system 200 can be implemented as part of an operating system, such as operating system 104 of FIG. 1. Alternatively, drive access system 200 can be implemented as part of another program or application that accesses hybrid drive 102, such as a Web browser program, a data access or storage program, and so forth. Drive access system 200 can be implemented as part of a single device (e.g., as part of an operating system of a computing device) or across multiple devices. For example, information collection module 202, LBA priority record 206, and I/O module 208 may be implemented by one computing device, and at least part of priority determination module 204 implemented by another device (e.g., a server coupled to the computing device via a network).

Drive access system 200 includes an information collection module 202, a priority determination module 204, an LBA priority record 206, and an I/O module 208. I/O module 208 and I/O module 116 of FIG. 1 can be the same module. Generally, information collection module 202 obtains various information regarding I/O accesses to hybrid drive 102. Priority determination module 204 determines priority levels for LBAs based on the collected information and maintains an LBA priority record 206 identifying the priority levels assigned to particular LBAs. I/O module 116 provides to hybrid drive 102 indications of the priority levels assigned to particular LBAs. For example, an LBA 210 assigned a priority level 212 is illustrated in FIG. 2. Additional data (e.g., to be written to hybrid drive 102) can also be sent to hybrid drive 102 along with the LBA 210 and priority level 212.

Information collection module 202 obtains various information regarding I/O accesses to hybrid drive 102. Module 202 can itself monitor various activity in the computing device implementing drive access system 200, or alternatively can retrieve or otherwise obtain the information regarding I/O accesses to hybrid drive 102 collected by other modules. Different priority categories can be supported by drive access system 200, and the information collected by module 202 can vary based on the particular priority categories that are supported. Each priority category refers to a state or type of operation being performed by the computing device including drive access system 200, such as accessing drive 102 when booting the computing device, accessing drive 102 when hibernating the computing device, accessing drive 102 when the computing device is resuming from hibernation, the user activity when accessing drive 102 (e.g., accessing drive 102 when the user is actively using the system, accessing drive 102 when the user is not actively using the system), and so forth. Examples of priority categories and the information collected by module 202 for each priority category are discussed in more detail below.

Priority determination module 204 determines priority levels for LBAs based on the information collected by information collection module 202. Each priority category has an associated one or more priority levels. Priority determination module 204 analyzes the collected information to identify, for a given priority category, which LBAs are to be assigned a priority level associated with that priority category. In one or more embodiments, information collection module 202 and priority determination module 204 have access to various information regarding I/O accesses and are able to determine based on such information the priority level to assign to each of multiple LBAs.

Different rules or criteria are used by module 204 to determine, based on the collected information, which LBAs are to be assigned a priority level associated with a particular priority category. Generally, the rules or criteria identify data to be assigned a particular priority level based on whether placing the data in performance part 112 is expected to increase the user-noticeable speed of the device (e.g., the speed at which a computing device boots or launches an application) and/or reduce the power consumption of the computing device. Additionally, the rules or criteria can identify data to be assigned a particular priority level so that there is a sufficient amount of data (e.g., 1 gigabyte or 4 gigabytes of data) at a lowest priority level in performance part 112 so that LBA data assigned the lowest priority level can be removed from performance part 112 and placed in base part 114 as desired (thus keeping LBA data with a higher priority level in performance part 112). Examples of these rules and criteria for particular priority categories are discussed in additional detail below.

Maintaining a sufficient amount of data at a lowest priority level in performance part 112 allows hybrid drive 102 to churn data at the lowest priority level in performance part 112 without adversely affecting data at higher priority levels in performance part 112. In situations where there is insufficient space in performance part 112 to store LBA data for all I/O accesses to hybrid drive 102, hybrid drive 102 moves data from performance part 112 to base part 114 starting with data at the lowest priority (and for data at that that lowest priority, according to some policy such as moving the least recently used (LRU) data first). Keeping the amount of data at the lowest priority relatively large when compared to data at higher priorities ensures that as space in performance part 112 becomes scarce, there is low priority data to move to base part 114 first, and therefore higher priority data is less likely to be moved. Additionally, by keeping the amount of data at the lowest priority relatively large, data added to performance part 112 at the lowest priority is permitted to remain in performance part 112 for a reasonably long amount of time even though performance part 112 may be relatively full. E.g., by implementing an LRU policy in determining which data is moved out of performance part 112 first, there is a sufficient amount of data (e.g., 1 gigabyte or 4 gigabytes of data) that would be moved out of performance part 112 before the newly added data is moved out of performance part 112.

Multiple different priority levels can be supported by drive access system 200, and the priority levels can be labeled in different manners. In one or more embodiments there are four priority levels, labeled as: Priority Level 4, Priority Level 3, Priority Level 2, and Priority Level 1. However, there can alternatively be any number of priority levels. The priority levels can also be labeled in different manners, such as using letters, different characters or symbols, and so forth. In addition to the priority levels, the drive access system 200 may support no priority level for some LBAs. LBA data assigned no priority level is stored in base part 114 rather than performance part 112—no determination need be made by hybrid drive 102 as to which part the LBA data is stored in. It should also be noted that in one or more embodiments hybrid drive 102 can implement one or more additional hidden or private priority levels. These additional hidden or private priority levels are not used by and are not visible to drive access system 200, but can be used by hybrid drive 102 to manage where LBA data is stored according to internal policy of hybrid drive 102.

Priority determination module 204 maintains an LBA priority record 206 identifying the priority levels assigned to particular LBAs. Generally, LBA priority record 206 identifies, for a given LBA, the priority level to which the LBA is assigned. In some situations, however, a particular LBA may be assigned to no priority level, in which case no identification of an assigned priority level may be included in LBA priority record 206 for the LBA.

Figure 3:
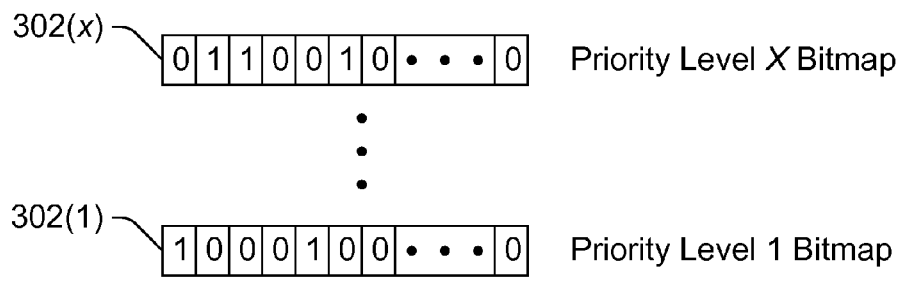
FIG. 3 illustrates an example set of bitmaps of a logical block address (LBA) priority record in accordance with one or more embodiments.

In one or more embodiments, LBA priority record 206 is a set of one or more bitmaps. FIG. 3 illustrates an example set of bitmaps 300 of an LBA priority record in accordance with one or more embodiments. The set of bitmaps 300 include multiple (x) bitmaps 302(1), . . . , 302(x), each corresponding to one of multiple priority levels illustrated as Priority Level 1, . . . , Priority Level X. In one or more embodiments, each bitmap has multiple cells that store a bit, each cell corresponding to a particular range of LBAs (a group of LBAs, such as a group of LBAs at which 16 kilobytes of data or 64 kilobytes of data is stored, as discussed above). One value in the cell (e.g., a value of 0) indicates that the LBAs corresponding to the cell do not have the priority level corresponding to the bitmap, and another value in the cell (e.g., a value of 1) indicates that the LBAs corresponding to the cell do have the priority level corresponding to the bitmap. For example, looking at the leftmost cell of each bitmap 302, the LBAs corresponding to the leftmost cell have Priority Level 1 (due to the bit in the cell having a value of 1 in bitmap 302(1) and a value of 0 in bitmap 302(x)).

LBA priority record 206 of FIG. 2 can also be implemented using sparse bitmaps in order to reduce the amount of storage space used to maintain LBA priority record 206. Sparse bitmaps refer to multi-level or multi-layer maps, each cell of a map in one layer representing multiple cells of a lower layer. Sparse bitmaps can be implemented in a variety of different manners.

Figure 4:
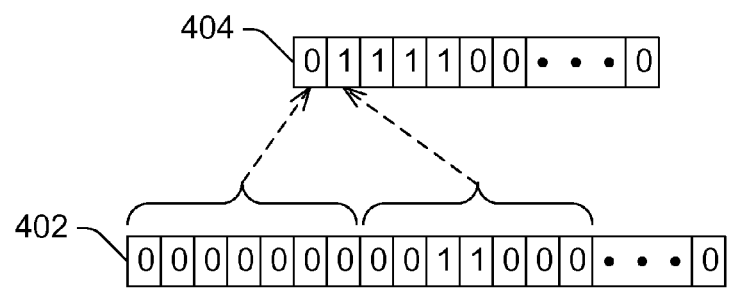
FIG. 4 illustrates an example of a sparse bitmap of an LBA priority record in accordance with one or more embodiments.

FIG. 4 illustrates an example of a sparse bitmap 400 of an LBA priority record in accordance with one or more embodiments. Sparse bitmap 400 includes two layers with a lower layer bitmap 402 and an upper layer map 404. Lower layer bitmap 402 includes multiple cells each corresponding to an LBA. Lower layer bitmap 402 can be, for example, a bitmap 302 of FIG. 3. The cells in bitmap 402 and map 404 are illustrated as being assigned a value of 0 to indicate that the LBAs corresponding to the cells do not have the priority level corresponding to the bitmap 402, and assigned a value of 1 to indicate that the LBAs corresponding to the cells do have the priority level corresponding to the bitmap 402. However, it should be noted that other values can alternatively be used (e.g., a value of 1 to indicate that the LBAs corresponding to the cells do not have the priority level corresponding to the bitmap 402, and a value of 0 to indicate that the LBAs corresponding to the cells do have the priority level corresponding to the bitmap 402).

Upper layer bitmap 404 includes multiple cells, each representing multiple cells in lower layer bitmap 402. If all of the cells in bitmap 402 that are represented by a particular cell in map 404 have a value of 0, then that particular cell in map 404 is also assigned a value of 0. If at least one of the cells in bitmap 402 that are represented by a particular cell in map 404 has a value of 1, then that particular cell in map 404 is also assigned a value of 1. Thus, to determine whether a particular LBA corresponds to the priority level corresponding to bitmap 402, a check can be made of the values of the cells in map 404, and for a particular cell in map 404 having a value of 0 it is readily known that none of the LBAs corresponding to the cells in bitmap 402 represented by that particular cell in bitmap 404 have the priority level corresponding to the bitmap 402.

Using sparse bitmaps, the sets of bitmaps can be stored and accessed with less memory requirements. For example, upper layer map 404 can be copied into random access memory of a computing device, but only the portions of bitmap 402 that are represented by a value of 1 are copied into random access memory. Furthermore, access to portions (e.g., groups of cells) of the sparse bitmaps can be monitored (e.g., by drive access system 200 of FIG. 2) and infrequently accessed portions (e.g., portions accessed less than a threshold amount of time) can be compressed. This compression conserves storage space (e.g., random access memory), and compressed portions can be decompressed if accessed.

The size of bitmap 402 and map 404 can vary, based at least in part on the amount of data (e.g., number of bytes) each bit in a bitmap represents and on the amount of storage space in the base part of the hybrid drive. For example, if the base part of the hybrid drive has 1 terabyte of storage space and each bit in lower layer bitmap 402 represents 16 kilobytes, then lower layer bitmap 402 would be 8 megabytes. Lower layer bitmap 402 can be broken into 4 kilobyte bitmaps, each representing 512 megabytes of the base part of the hybrid drive. Upper layer map 404 would thus be 2 kilobits.

Although upper layer map 404 is discussed above as being a bitmap in which each cell is assigned a value of 0 or 1, it should be noted that upper layer map 404 can be implemented in other manners. For example, rather than a value of 0 or 1, each cell in upper layer map 404 may include a pointer to lower layer bitmap 402 (e.g., a pointer to one of the cells in lower layer bitmap 402 that are represented by the cell of upper layer map 404). Various additional information may also be maintained, such as a lock value associated with each cell of upper layer map 404 to maintain synchronization when accessing upper layer map 404 and/or lower layer bitmap 402.

Although two layers are illustrated in FIG. 4, it should be noted that a sparse bitmap can include any number of layers, with each cell in the bitmap at the lowest layer corresponding to an LBA, and each cell in the bitmap at a higher layer representing multiple cells of a lower layer.

Returning to FIG. 2, priority determination module 204 determines the priority levels for LBAs and generates or updates LBA priority record 206 as appropriate at various times. In one or more embodiments, module 204 determines the priority levels and generates or updates record 206 at regular or irregular intervals, such as approximately daily, approximately weekly, an amount of time after some event (e.g., approximately 24 hours after being powered on or resumed from a hibernation mode), and so forth. Thus, it should be noted that the priority levels assigned to various LBAs can change over time. Module 204 can also determine the priority levels (and optionally update record 206) in response to an I/O access to be made to an LBA by I/O module 208 for which no priority level corresponding to the LBA has been set, also referred to as determining the priority level at runtime.

As discussed above, different priority categories can be supported by drive access system 200, and the information collected by information collection module 202 can vary based on the particular priority categories that are supported. Following are example priority categories that can be supported by drive access system 200, as well as examples of information collected for these priority categories and how determinations can be made as to which LBAs fall in which priority categories. These example priority categories are: boot, hibernate, page or swap file, application launch, and general usage.

Boot Priority Category.

Information collection module 202 obtains information identifying I/O accesses during booting of the computing device. Booting the computing device refers to starting running of the computing device in response to powering-on and/or resetting the computing device. The information can identify I/O accesses during one or more previous boots of the computing device. This information can be obtained from various sources, such as a boot prefetcher that traces I/O accesses during booting of the computing device. The LBAs accessed as part of I/O accesses during booting of the computing device are assigned the priority level of the boot priority category.

During booting of the computing device, I/O accesses are assigned the priority level of the boot priority category. LBA priority record 206 need not be accessed to determine the priority level of LBAs during booting of the computing device. Rather, a module (e.g., I/O module 208) can be configured to assign the priority level of the boot priority category to I/O accesses during booting of the computing device without consulting LBA priority record 206. In one or more embodiments, the booting of the computing device is managed by one or more modules operating in a kernel mode of the operating system. These one or more modules can assign each I/O access they perform the priority level of the boot priority category without consulting LBA priority record 206.

Hibernate Priority Category.

Hibernation refers to a low power mode for the computing device during which power is not provided to most (if not all) volatile memory in the computing device. When putting a computing device into hibernation, also referred to as hibernating the computing device, the contents of volatile memory (e.g., RAM) are written to hybrid drive 102 prior to placing the computing device in the low power mode. The LBAs accessed as part of I/O accesses when hibernating the computing device are assigned the priority level of the hibernate priority category.

In one or more embodiments, the computing device supports a hiberboot technique that is similar to hibernation. With hiberboot, rather than shutting down a computing device in response to a shut down request, the users of the computing device are logged off their accounts and the computing device hibernates. The LBAs accessed as part of I/O accesses when hibernating the computing device as part of a hiberboot technique are assigned the priority level of the hibernate priority category.

During resuming of the computing device from hibernation, the contents of volatile memory that were previously written to hybrid drive 102 are read from hybrid drive 102 and written back into volatile memory. It is unlikely that the LBAs, once written back to volatile memory, would be read from hybrid drive 102 again. Accordingly, after writing the LBAs back to volatile memory drive access system 200 issues a trim command to hybrid drive 102 identifying the LBAs accessed as part of I/O accesses when hibernating the computing device. The trim command informs hybrid drive 102 that the identified LBAs are no longer needed and are unlikely to be read again, so hybrid drive 102 can dispose of those LBAs (e.g., treat them as free space). Thus, after the computing device has resumed from hibernation, the LBAs stored in performance part 112 can be disposed of.

During hibernating of the computing device I/O accesses are assigned the priority level of the hibernate priority category. LBA priority record 206 need not be accessed to determine the priority level of LBAs during hibernating of the computing device and/or resuming of the computing device from hibernation. Rather, I/O module 208 can be configured to assign the priority level of the hibernate priority category to I/O accesses during hibernating of the computing device without consulting LBA priority record 206, and issue the trim command after resuming the computing device from hibernation without consulting LBA priority record 206. In one or more embodiments, the hibernating and resuming from hibernation of the computing device is managed by one or more modules operating in a kernel mode of the operating system. These one or more modules can assign each I/O access they perform the priority level of the hibernate priority category as discussed above, and issue the trim command, without consulting LBA priority record 206. In situations in which a trim command is not supported by hybrid drive 102, during resuming of the computing device from hibernation the priority of the LBAs being read can remain unchanged (or alternatively, the LBAs can be read and assigned the lowest priority level).

Page or Swap File Priority Category.

Memory in the computing device can be managed using pages, allowing the computing device to use a larger memory space than there is physical memory. Pages of memory can be transferred (also referred to as swapped) out of volatile memory to hybrid drive 102, and transferred (also referred to as swapped) in from hybrid drive 102 to volatile memory, as desired by a memory manager of the computing device. The LBAs accessed as part of I/O accesses when swapping a page file to or from hybrid drive 102 are assigned the priority level of the page or swap file priority category.

Similar to swapping out or in pages of memory, the memory manager can swap out of volatile memory to hybrid drive 102 an application, which refers to swapping out the private pages of an application that are not already stored in (backed by) a file. The memory manager can also swap in from hybrid drive 102 to volatile memory the application. The LBAs accessed as part of I/O accesses when swapping an application to or from hybrid drive 102 are assigned the priority level of the page or swap file priority category.

During swapping in or out a page of memory or an application, I/O accesses are assigned the priority level of the page or swap file priority category. LBA priority record 206 need not be accessed to determine the priority level of LBAs during swapping in or out a page of memory or an application. Rather, I/O module 208 can be configured to assign the priority level of the page or swap file priority category to I/O accesses during swapping in or out a page of memory or an application without consulting LBA priority record 206. In one or more embodiments, the swapping in or out of a page of memory or an application is managed by one or more modules operating in a kernel mode of the operating system. These one or more modules can assign each I/O access they perform the priority level of the page or swap file priority category without consulting LBA priority record 206.

Application Launch Priority Category.

Information collection module 202 obtains information identifying I/O accesses during launching of an application on the computing device. Launching an application on the computing device refers to starting running of the application on the computing device. The information can identify I/O accesses for a particular amount of time (e.g., five seconds) after beginning launching the application as I/O accesses during the launching of the application. Different information can be obtained by module 202 for each different application launched on the computing device.

Information collection module 202 also obtains information regarding usage of applications on the computing device. Various different information regarding how an application is used on the computing device can be obtained. For example, the information regarding how an application is used can include information indicating how frequently the application is used, whether the application is run in the foreground or background, whether the user interacts with the application, whether the application is running (e.g., in the foreground) while the user is active on the computing device (e.g., while the user is providing user inputs to the device), and so forth.

Given this different information, priority determination module 204 can prioritize applications based on a perceived importance of the application to the user. For example, applications that are running while the user is active on the computing device can be deemed to be of greater importance to the user than applications that are not running while the user is active on the computing device. By way of another example, applications that are running in the foreground on the computing device can be deemed to be of greater importance to the user than applications that are not running in the foreground on the computing device. Applications can be prioritized into two or more different priority levels, with applications deemed to be of more importance to the user being assigned a priority level that is higher than applications not deemed to be of more importance to the user.

In some situations, information collection module 202 obtains information regarding usage of applications on the computing device based on LBAs of the applications. In such situations, priority determination module 204 updates LBA priority record 206 as appropriate for the LBAs of the applications based on the priority levels assigned to the applications. In other situations, information collection module 202 obtains information regarding usage of applications on the computing device in other formats, such as file identifiers, file identifiers and offsets into files, and so forth. In such situations, priority determination module 204 maps the information in these other formats to LBAs, and updates LBA priority record 206 as appropriate for the mapped-to LBAs of the applications based on the priority levels assigned to the applications. I/O module 208 uses LBA priority record 206 to identify priority levels of LBAs as discussed above, and thus identifies the assigned priority levels for LBAs of particular applications.

General Usage Priority Category.

Information collection module 202 obtains information identifying LBAs accessed during operation of the computing device. The LBAs accessed can be grouped into one of multiple groups based on various different information regarding operation of the computing device that can be obtained by module 202. For example, the groups can include: a group for LBAs accessed when the user is active on the computing device (e.g., providing user input to the device), a group for LBAs accessed by an application in the foreground, a group for LBAs accessed when the computing device is going into or coming out of a standby mode (or other low power mode), a group for LBAs accessed when a user is logging on to or off of the computing device, a group for LBAs accessed when switching between current users (switching user accounts) on the computing device, and so forth. For each group, various information regarding the LBAs accessed can also be maintained, such as the frequency of access to each LBA, how recently each LBA was accessed, and so forth.

Given this different information, priority determination module 204 can prioritize LBAs based on a perceived importance of the LBA to the user. For example, LBAs accessed when the user is active on the computing device can be deemed to be of greater importance to the user than LBAs accessed when the user is not active on the computing device. By way of another example, LBAs accessed by an application in the foreground can be deemed to be of greater importance to the user than LBAs accessed by an application in the background. Different groups of access can be assigned the same or different priorities, and different LBAs within the same group can be assigned the same or different priorities. The priorities assigned to different groups and/or LBAs within a group can be determined in different manners based on the desires of the developer of priority determination module 204, an administrator or user of the computing device, and so forth.

In some situations, information collection module 202 obtains information regarding the specific LBAs accessed. In such situations, priority determination module 204 updates LBA priority record 206 as appropriate for the LBAs of the applications based on the determined priority levels. In other situations, information collection module 202 obtains information regarding I/O accesses in other formats, such as file identifiers, file identifiers and offsets into files, and so forth. In such situations, priority determination module 204 maps the information in these other formats to LBAs, and updates LBA priority record 206 as appropriate for the mapped-to LBAs based on the determined priority levels. I/O module 208 uses LBA priority record 206 to identify priority levels of LBAs as discussed above, and thus identifies the assigned priority levels for the various LBAs.

The priority levels assigned to different priority categories and/or different LBAs within a priority category can vary. Different priority levels can be assigned based on the desires of a developer of priority determination module 204, an administrator or user of the computing device implementing drive access system 200, and so forth. The priority levels assigned can also vary based on the number of different priority levels supported by drive access system 200.

In one or more embodiments, the various priority categories discussed above are used by priority determination module 204 to assign priority levels to LBAs. Priority levels can also be assigned to LBAs by modules operating in a kernel mode of the operating system as discussed above. However, situations can arise in which no priority level corresponding to an LBA has been set, such as an LBA for an application installed since module 204 last assigned priority levels, an LBA for user data generated since module 204 last assigned priority levels, and so forth. In such situations, priority determination module 204 determines the priority level of the LBA at runtime.

The priority level assigned to an LBA at runtime can be determined in a variety of different manners. In one or more embodiments, the LBA is assigned either the lowest priority level (e.g., Priority Level 1) or one higher than the lowest priority level (e.g., Priority Level 2) based on the amount of available (e.g., unused) storage space in performance part 112. If there is at least a threshold amount (e.g., one gigabyte) of available storage space in part 112 then the LBA is assigned one higher than the lowest priority level, and if there is not at least the threshold amount of available storage space in part 112 then the LBA is assigned the lowest priority level. Various other factors can also be used in determining the priority level assigned to an LBA at runtime as discussed in more detail below, such as whether the I/O access is a random or sequential I/O access, whether a hard disk is spun up, and so forth.

It should be noted that drive access system 200 can have knowledge of the amount of storage space in performance part 112 (e.g., feedback indicating the size of performance part 112 can be provided to drive access system 200 by hybrid drive 102). Priority determination module 204 can leverage this knowledge in assigning priority levels for LBAs. For example, drive access system 200 oftentimes desires to maintain at least a threshold amount of the storage space in performance part 112 available for low priority LBAs so that when LBAs are transferred from performance part 112 to base part 114, higher priority LBAs are not transferred out of part 112. This threshold amount of storage space can be a particular number of bytes (e.g., 4 gigabytes) or a relative number of bytes (e.g., 10% of the size of the storage space of performance part 112). Priority determination module 204 can leverage this knowledge by assigning priority levels so that the number of LBAs assigned to higher priority levels does not result in LBAs assigned to the higher priority levels exceeding the size of performance part 112 less this threshold amount of storage space. For example, if performance part 112 is 32 gigabytes and the threshold amount is 4 gigabytes, then module 204 assigns priority levels so that no more than 28 gigabytes of LBAs are assigned priority levels higher than the lowest priority level.

In one or more embodiments, drive access system 200 supports four priority levels, labeled as: Priority Level Q, Priority Level R, Priority Level S, and Priority Level T. Priority Level Q is the highest priority level, Priority Level R is the next highest priority level (one level below Priority Level Q), Priority Level S is the next highest priority level (one level below Priority Level Q), and Priority Level T is the lowest priority level. LBAs for I/O accesses in the boot priority category are assigned Priority Level Q. LBAs for I/O accesses in the page or swap file priority category are assigned Priority Level R. LBAs for I/O accesses in the hibernate priority category are assigned Priority Level R (or alternatively Priority Level Q). LBAs for I/O accesses in the application launch priority category for applications run in the foreground are assigned Priority Level S, and LBAs for I/O accesses in the application launch priority category for applications not run in the foreground are assigned Priority Level T. LBAs accessed when the computing device is going into or coming out of a standby mode, when a user is logging on to or off of the computing device, or when switching between current users on the computing device are assigned Priority Level S. Other LBAs not assigned to Priority Level Q, R, or S can be assigned to Priority Level T, or alternatively can be assigned no priority level to indicate that such other LBAs are to be stored in base part 114 rather than performance part 112.

Examples of priority categories are discussed above. However, priority determination module 204 can additionally or alternatively assign priority levels based on other information and/or criteria. In one or more embodiments, situations can arise where data in LBAs on hybrid drive 102 are moved to a different location on hybrid drive 102. Such situations can arise during various maintenance operations on hybrid drive 102, such as when defragmenting hybrid drive 102. In such situations, I/O commands are issued from I/O module 208 to read and write LBAs for data being moved on hybrid drive 102. A record of such moves is maintained by drive access system 200, and the priority levels assigned to the LBAs to which the data is moved and the LBAs from which the data is moved are updated. These priority levels can be updated in various manners, such as by issuing an I/O command to read the LBAs (the I/O command including an indication of the priority level for the LBA). Alternatively, these priority levels can be updated in other manners, such as by including an indication of the priority level for the LBA in the I/O commands issued as part of the process of moving the data on hybrid drive 102.

Situations can also arise in which priority determination module 204 receives feedback from hybrid drive 102 as to how many LBAs are stored (or how much storage space is used) in performance part 112 at each of the various priority levels. Priority determination module 204 can use this feedback to determine priority levels for LBAs. In one or more embodiments, if there is at least a threshold number of LBAs (e.g., 80% of the number of LBAs stored in performance part 112) assigned one or more particular priority levels stored in performance part 112, then priority determination module 204 lowers the priority levels of LBAs for particular types of access. For example, the priority levels for LBAs included as part of a sequential I/O access can be lowered although priority levels for LBAs included as part of a random I/O access (e.g., accessing less than the threshold number of sequential LBAs) are not lowered. Sequential I/O accesses can be identified in various manners, such as identifying I/O accesses to at least a threshold number (e.g., five) of sequential LBAs, identifying I/O accesses based on information regarding operation of the computing device (e.g., I/O accesses when the computing device is going into or coming out of a standby mode, I/O accesses when a user is logging on to or off of the computing device, and so forth). Performance improvements obtained by storing LBAs for random I/O accesses in performance part 112 are typically greater than when storing LBAs for sequential I/O accesses in part 114. Thus, by lowering the priority levels of LBAs for sequential I/O accesses, the LBAs for sequential I/O access are more likely to be stored in base part 114 than in performance part 112.

Additionally, in one or more embodiments, when determining the priority level for an LBA at runtime, priority determination module 204 can determine the priority level based on a current state of hybrid drive 102. Information regarding the current state of hybrid drive 102 is provided as feedback to drive access system 200 by hybrid drive 102. The current state of hybrid drive 102 can include, for example, whether a hard drive that is base part 114 is currently spinning or is spun down. Module 204 can use the current state of hybrid drive 102 in different manners, such as by increasing the priority level of an LBA if the hard drive that is base part 114 is spun down (e.g., assigning the LBA as Priority Level S rather than Priority Level T). By increasing the priority level of an LBA if the hard drive that is base part 114 is spun down, the LBA is more likely to be stored in performance part 112 and the power that would be expended to spin up the hard drive in order to store the LBA on base part 114 is conserved.

Furthermore, performance part 112 can have a particular estimated lifetime. For example, in situations in which performance part 112 is a solid state disk, each cell of the solid state disk can typically be written to a particular number of times before the cell ceases functioning properly and can no longer be written to. This number of times is also referred to as the lifetime of the solid state disk. Hybrid drive 102 maintains an indication of the estimated remaining lifetime of part 112, and can provide feedback to drive access system 200 indicating as a current state of hybrid drive 102 the estimated remaining lifetime of part 112.

In one or more embodiments, when determining the priority level for an LBA, priority determination module 204 can determine the priority level based on the estimated remaining lifetime of performance part 112. For example, if the estimated remaining lifetime of part 112 is less than a threshold amount (e.g., a particular number of months or a particular percentage of the lifetime of part 112), then the priority levels of LBAs can be lowered or changed to no priority. The priority levels of all LBAs can be lowered or changed to no priority, or the priority levels of only particular LBAs can be lowered or changed to no priority. By lowering the priority levels of LBAs when the estimated remaining lifetime of part 112 is less than a threshold amount, the LBAs with lowered priority levels are more likely to be stored in base part 114 than in performance part 112, thus reducing the writing of LBAs to performance part 112 and extending the amount of time before the lifetime of performance part 112 expires. By changing the priority levels of LBAs to no priority when the estimated remaining lifetime of part 112 is less than a threshold amount, the LBAs with no priority level are stored in base part 114 rather than in performance part 112, thus reducing the writing of LBAs to performance part 112 and extending the amount of time before the lifetime of performance part 112 expires.

Alternatively, rather than lowering the priority levels of LBAs, if the estimated remaining lifetime of performance part 112 is less than the threshold amount, drive access system 200 can cease assigning priority levels to LBAs and/or cease providing priority levels to hybrid drive 102. The use of performance part 112 can thus be effectively turned off, and the user notified of such so that appropriate action can be taken if desired (e.g., replace performance part 112 and/or hybrid drive 102).

Additionally, as discussed above drive access system 200 can be part of an operating system of the computing device. When booting the computing device, various I/O accesses to hybrid drive 102 can occur before the operating system begins running and I/O module 208 is able to include indications of priority levels for LBAs in I/O commands. In such situations, hybrid drive 102 can operate in a boot pinning mode (e.g., in response to a request or command from drive access system 200 when shutting down the computing device). In boot pinning mode, hybrid drive 102 operates as if the LBA in each I/O access were assigned the highest priority level (e.g., Priority Level Q or the priority level of the boot priority category). Thus, LBAs in I/O accesses that are received before I/O module 208 begins running are assigned the same priority level as LBAs for I/O accesses in the boot priority category (assuming LBAs for I/O accesses in the boot priority category are assigned the highest priority level).

Hybrid drive 102 continues to operate in boot pinning mode until a particular threshold value is satisfied or a command to exit boot pinning mode is received from drive access system 200. The threshold value can take various forms, such as a threshold amount of time elapsing (e.g., 5 seconds), a threshold amount of data (e.g., a particular number of bytes) having been read and/or written, a threshold amount of data (e.g., a particular number of bytes) having been stored in performance part 112, and so forth.

I/O module 208, after beginning execution and being ready to provide indications of priority levels assigned to LBAs, issues a command to hybrid drive 102 to exit boot pinning mode as the priority levels assigned to LBAs for subsequent I/O accesses will be indicated by I/O module 208. However, if the threshold value is satisfied without receiving a command to exit boot pinning mode, hybrid drive 102 assumes that the computing device does not include a drive access system that assigns priority levels, and thus exits boot pinning mode to avoid assigning the priority level for LBAs for all I/O accesses during the operation of hybrid drive 102 the highest priority level. The command to exit boot pinning mode can take various forms, such as a request to read a hybrid information log page maintained by hybrid drive 102.

It should be noted that, although performance part 112 is discussed as being higher performance than base part 114, under certain circumstances the performance characteristics of part 112 may be approximately the same or not significantly better than that of part 114. For example, certain types of solid state drives may perform certain types of accesses (e.g., sequential I/O accesses) at approximately the same rate or not a significantly faster rate than some hard drives. By way of another example, parts 112 and parts 114 may be implemented with different types of memory (e.g., flash, memristor, phase change, etc.), and the performance characteristics of performance part 112 for certain types of accesses may be worse than (e.g., lower than) or approximately the same as the performance characteristics of base part 114, and for other types of accesses the performance characteristics of part 112 may be better than (e.g., greater than) the performance characteristics of part 114. Such situations can be identified in various manners, such as by drive access system 200 sending test commands to hybrid drive 102 to test the performance of parts 112 and 114, hybrid drive 102 providing feedback to drive access system 200 indicating the rates or performance characteristics of parts 112 and 114, and so forth.

Under such circumstances, there can be little if any speed increase obtained by storing LBAs in performance part 112 for types of accesses for which part 112 has approximately the same or worse performance characteristics than part 114 (e.g., for sequential I/O accesses). Thus, priority determination module 204 can assign LBAs for such types of accesses (e.g., sequential I/O accesses) a lower priority level than LBAs for other types of accesses (e.g., random I/O accesses) so that the LBAs for such types of accesses (e.g., sequential I/O accesses) are more likely to be stored in base part 114 than in performance part 112. Various other modules can also optionally assign LBAs for such types of accesses (e.g., sequential I/O accesses) a lower priority level under such circumstances than would otherwise be assigned to those LBAs. For example, one or more modules managing booting of the computing device may assign each I/O access they perform a priority level lower than the priority level of the boot priority category. By way of another example, one or more modules managing hibernating of the computing device may assign each I/O access they perform a priority level lower than the priority level of the hibernate priority category.

Alternatively, priority determination module 204 need not assign at least a portion of the LBAs for sequential I/O accesses the lower priority level. Situations can arise where it takes a particular amount of time for base part 114 to be able to transition to a state in which data can be read from and/or written to base part 114. For example, a hard drive typically takes a particular amount of time (e.g., 5 seconds) to spin up and begin operating to read and write data. In such situations, priority determination module 204 can estimate a number of LBAs that would be read or written during that particular amount of time, and keep the priority level of that number of LBAs for the beginning of the sequential I/O accesses unchanged. Various other modules that issue I/O commands to hybrid drive 102 (e.g., one or more modules managing booting of the computing device, one or more modules managing hibernating of the computing device) may similarly keep the priority level of that number of LBAs for the beginning of the sequential I/O access unchanged. Thus, the LBAs accessed in the beginning of the sequential I/O accesses are more likely to be stored in performance part 112 than base part 114, and can be read or written while the hard drive is spinning up.

Situations can also arise in which hybrid drive 102 is accessed by another computing device and/or operating system that does not support the assigning priorities to data for hybrid drives techniques discussed herein. In such situations, the other computing device and/or operating system can assign different priority levels for LBAs on hybrid drive 102. Drive access system 200 can remedy such situations by detecting if such an access has occurred, and if so adjusting the priority levels assigned to the LBAs.

Drive access system 200 can detect if such an access has occurred in different manners. In one or more embodiments, drive access system 200 receives feedback from hybrid drive 102 as to how many LBAs are stored (or how much storage space is used) in performance part 112 at each of the various priority levels. Based on LBA priority record 206, drive access system 200 can readily determine how many LBAs are expected to be included (or how much storage space is expected to be used) on hybrid drive 102 for each priority level. If the feedback provided by hybrid drive 102 indicates a number of LBAs or amount of storage space at a priority level that is different (e.g., by at least a threshold amount) than that determined number of LBAs or amount of storage space, then drive access system 200 determines that such an access occurred. However, if the feedback provided by hybrid drive 102 indicates a number of LBAs or amount of storage space at a priority level that is the same (or within a threshold amount of) that determined number of LBAs or amount of storage space, then drive access system 200 determines that such an access did not occur.

Drive access system 200 can remedy such situations by adjusting the priority levels assigned to the LBAs in different manners. In one or more embodiments, drive access system 200 issues a command to hybrid drive 102 to reset the priority levels for all LBAs in performance part 112 to the lowest priority level. Drive access system 200 then proceeds to operate as discussed above, with I/O module 208 including an indication of the assigned priority level for each LBA (as indicated in LBA priority record 206) with each I/O access issued to hybrid drive 102. Thus, over time as the LBAs are accessed, the priority levels for the LBAs in hybrid drive 102 will be returned to the priority levels indicated in LBA priority record 206.

In the discussions above, information collection module 202 is discussed as obtaining various information regarding I/O accesses to hybrid drive 102. Alternatively, module 202 can also obtain information regarding I/O accesses to other drives of the computing device implementing drive access system 200 regardless of the types of such other drives (e.g., hybrid drives, solid state drives, hard drives, etc.). Furthermore, module 202 can also obtain information regarding I/O accesses by drive access systems implemented on other computing devices. For example, drive access systems implemented on multiple different computing devices can optionally share information regarding I/O accesses (e.g., using a service accessible via a network), allowing the priority determination modules in each drive access system to determine priorities based on accesses across multiple computing devices. In such situations, the I/O access information can be shared in a generic manner—simply identifying LBAs that are accessed without identifying a particular user or a particular computing device. Additionally, in such situations the I/O access information can be shared only after receiving authorization from the user of the computing device to share the I/O access information—if no user authorization is received, the I/O access information is not shared.

In addition, the information regarding I/O accesses to hybrid drive 102 can be on a per user basis or a per computing device basis. Thus, priority determination module 204 can determine priority levels for LBAs for individual users of the computing device implementing drive access system 200, or alternatively can determine a single set of priority levels for LBAs for all users of the computing device.

It should be noted that, as discussed above, priority determination module 204 determines priority levels for LBAs. Situations can arise where the number of priority levels supported by priority determination module 204 is greater than the number of priority levels supported by hybrid drive 102. In such situations, the priority levels used by drive access system 200 are mapped to the priority levels used by hybrid drive 102. The specific mapping can vary based on the number of priority levels that are supported, the desires of the developer of drive access system 200, the desires of an administrator or user of the computing device implementing drive access system 200, and so forth. This mapping can occur at various times, such as when priority determination module 204 assigns priority levels to LBAs (thus, for example, LBA priority record 206 would include bitmaps for the priority levels supported by hybrid drive 102), when the priority level for an LBA is determined or otherwise obtained so that I/O module 208 can include the indication in an I/O access to hybrid drive 102, and so forth.

It should also be noted that, in the discussions above, the hybrid drive implements a technique referred to as on-demand caching. Priority levels are assigned to LBAs and the priority level for a given LBA is indicated to hybrid drive 102 along with the I/O access for that LBA. Hybrid drive 102 is thus able to store the data for the I/O access in the appropriate part 112 or 114 based on the indicated priority level. Performance part 112 need not be pre-populated with LBAs that are assigned higher priority levels, but rather can be populated as appropriate based on priority levels indicated in received I/O accesses, and can automatically adjust over time if priority levels assigned to various LBAs change.

However, it should be further noted that in some situations performance part 112 can be pre-populated with data for LBAs. For example, when hybrid drive 102 is first installed on a computing device or the computing device including hybrid drive 102 is built, hybrid drive 102 can be pre-populated with data that is expected to be higher priority. This data that is expected to be higher priority can be determined in different manners, such as based on knowledge of priority levels assigned to LBAs of other computing devices, based on knowledge of the developer or manufacturer of the computing device, and so forth. However, the priority levels assigned to LBAs for such pre-populated data need not, and typically do not, have the same priority levels as are assigned by priority determination module 204. For example, performance part 112 can be pre-populated with data for LBAs and automatically assigned the lowest priority level, which can subsequently be changed by hybrid drive 102 as I/O accesses are received from I/O module 208.

Figure 5:
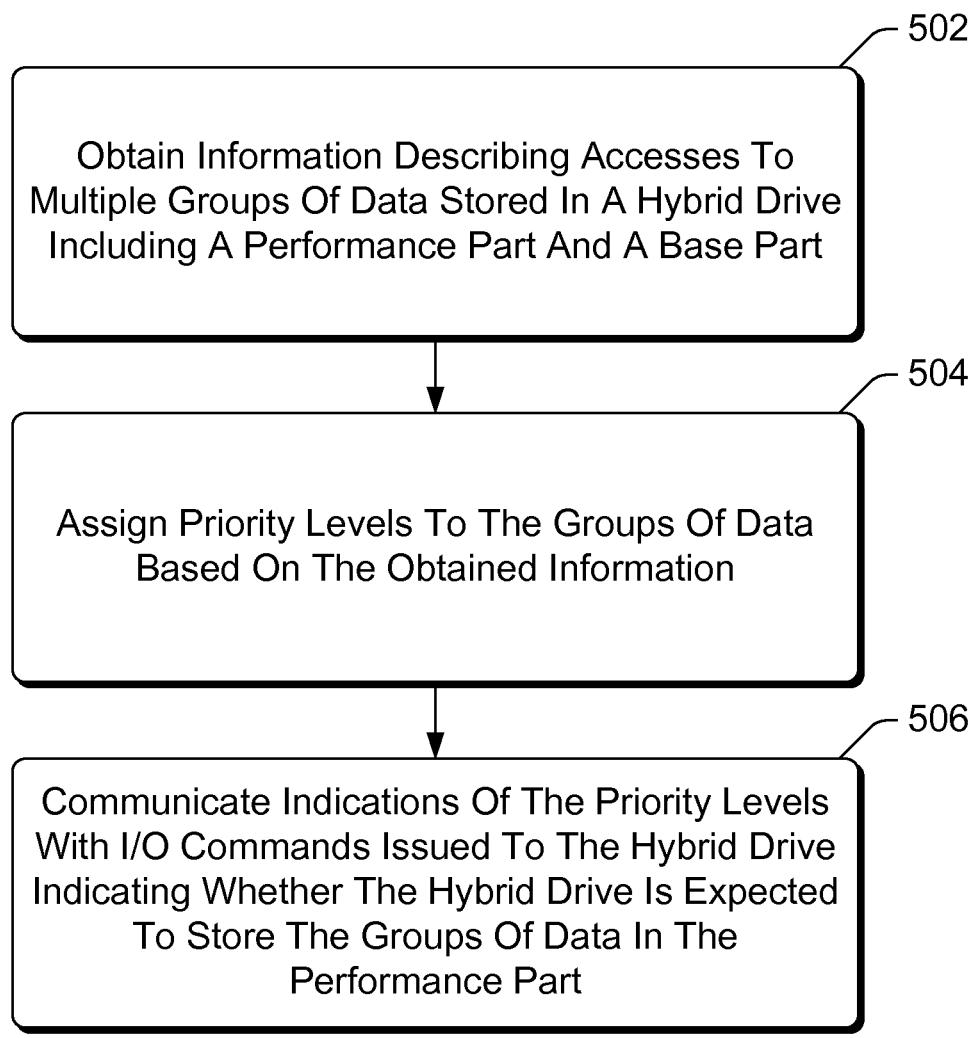
FIG. 5 is a flowchart illustrating an example process for assigning and communicating priorities for data for hybrid drives in accordance with one or more embodiments.

FIG. 5 is a flowchart illustrating an example process 500 for assigning and communicating priorities for data for hybrid drives in accordance with one or more embodiments. Process 500 is carried out by a drive access system, such as drive access system 200 of FIG. 2, and can be implemented in software, firmware, hardware, or combinations thereof. Process 500 is shown as a set of acts and is not limited to the order shown for performing the operations of the various acts. Process 500 is an example process for assigning and communicating priorities for data for hybrid drives; additional discussions of assigning and communicating priorities for data for hybrid drives are included herein with reference to different figures.

In process 500, information describing accesses to multiple groups of data stored in a hybrid drive is obtained (act 502). These groups of data can be identified by LBAs as discussed above, and various different information can be obtained as discussed above.

Priority levels are assigned to the multiple groups of data based on the obtained information (act 504). Multiple different priority levels can be used, and the priority level to which a particular group of data is assigned can be determined in various manners as discussed above.

Indications of the priority levels for the multiple groups of data are communicated to the hybrid drive as I/O commands are issued to the hybrid drive (act 506). Each I/O command accessing a particular group of data includes an indication of the priority level for that group of data as discussed above. The priority level for each group of data provides an indication to the hybrid drive whether the hybrid drive is expected to store the group of data in the performance part of the hybrid drive, although the hybrid drive is not bound to the indicated priority level and is not obligated to store any particular group of data in the performance part as discussed above.

Figure 6:
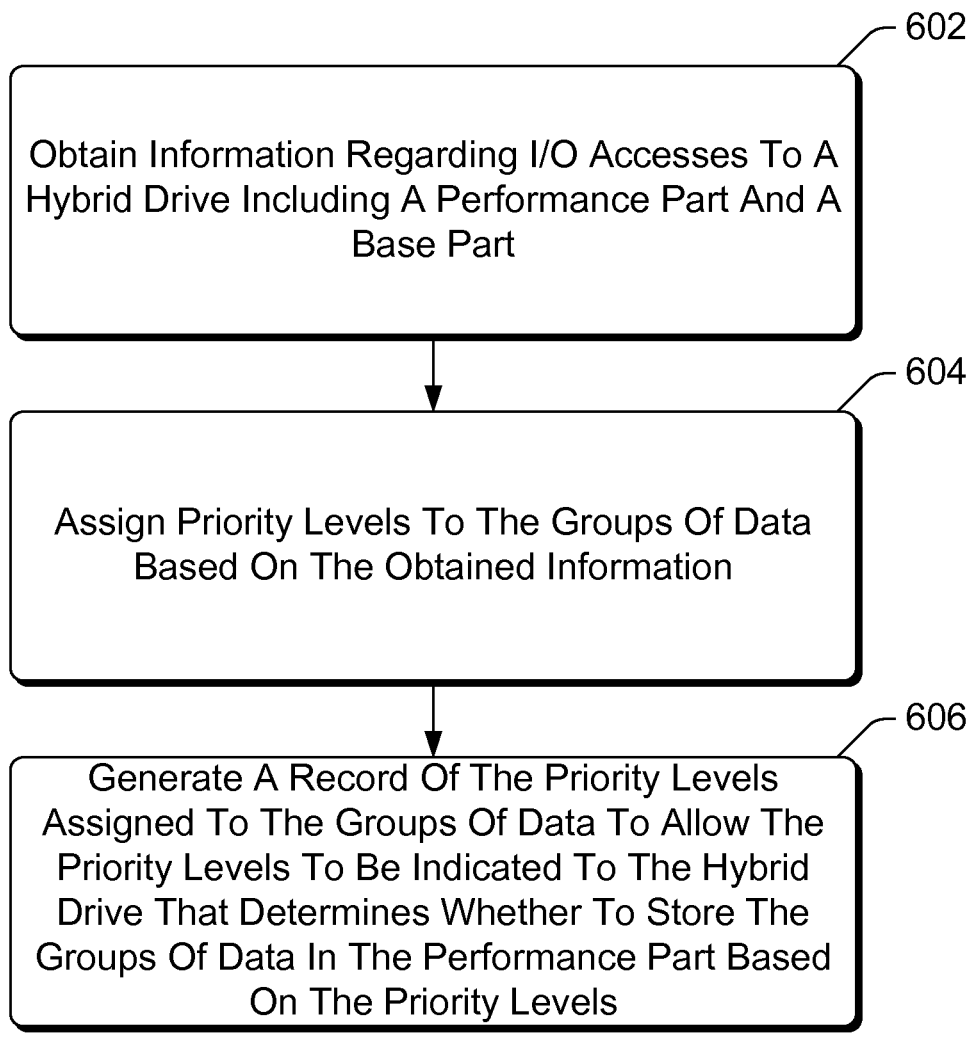
FIG. 6 is a flowchart illustrating an example process for assigning and generating a record of priorities for data for hybrid drives in accordance with one or more embodiments.

FIG. 6 is a flowchart illustrating an example process 600 for assigning and generating a record of priorities for data for hybrid drives in accordance with one or more embodiments. Process 600 is carried out by a drive access system, such as drive access system 200 of FIG. 2, and can be implemented in software, firmware, hardware, or combinations thereof. Process 600 is shown as a set of acts and is not limited to the order shown for performing the operations of the various acts. Process 600 is an example process for assigning and generating a record of priorities for data for hybrid drives; additional discussions of assigning and generating a record of priorities for data for hybrid drives are included herein with reference to different figures.

In process 600, information describing accesses to multiple groups of data stored in a hybrid drive is obtained (act 602). These groups of data can be identified by LBAs as discussed above, and various different information can be obtained as discussed above.

Priority levels are assigned to the multiple groups of data based on the obtained information (act 604). Multiple different priority levels can be used, and the priority level to which a particular group of data is assigned can be determined in various manners as discussed above.

A record of the priority levels assigned to the multiple groups of data is generated (act 606). This record can be, for example, one or more bitmaps associated with each priority level as discussed above. The priority level for each of the multiple groups of data can be provided to the hybrid drive to provide an indication to the hybrid drive whether the hybrid drive is expected to store the group of data in the performance part of the hybrid drive, although the hybrid drive is not bound to the indicated priority level and is not obligated to store any particular group of data in the performance part as discussed above.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Although particular functionality is discussed herein with reference to particular modules, it should be noted that the functionality of individual modules discussed herein can be separated into multiple modules, and/or at least some functionality of multiple modules can be combined into a single module.

Figure 7:
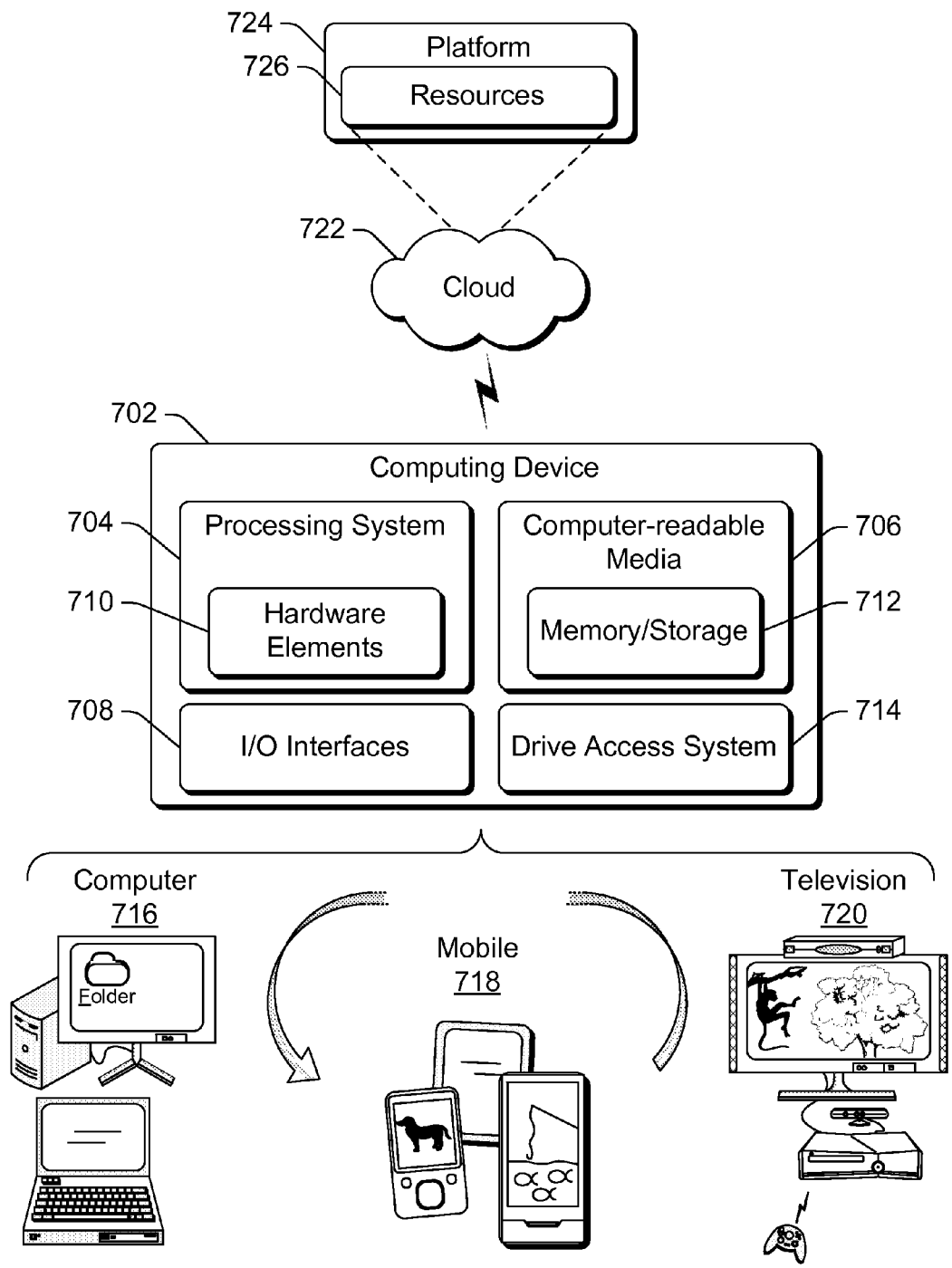
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Computing device 702 also includes a drive access system 714. Drive access system 714 provides various functionality, including determining priority levels for LBAs as discussed above. Drive access system 714 can implement, for example, drive access system 200 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
  obtaining information describing accesses to multiple groups of data stored in a hybrid drive, the hybrid drive including both a performance part and a base part in which the groups of data can be stored; and
  communicating, with an input/output (I/O) command issued to the hybrid drive, an indication of a priority level of a group of data accessed by the I/O command, the priority level providing an indication to the hybrid drive whether the hybrid drive is expected but not obligated to store the group of data in the performance part, the priority level having been assigned to the group of data based on the information.

2. A method as recited in claim 1, the performance part being higher performance than the base part.

3. A method as recited in claim 1, further comprising maintaining a record of the assigned priority levels for the multiple groups of data.

4. A method as recited in claim 1, the priority level of one or more of the multiple groups of data changing over time.

5. A method as recited in claim 1, each group of data comprising data at a contiguous range of logical block addresses.

6. A method as recited in claim 1, the information describing accesses to multiple groups of data including information identifying groups of data that are accessed when a computing device is going into or coming out of a standby mode, a particular priority level of multiple priority levels having been assigned to groups of data accessed when the computing device is going into or coming out of a standby mode.

7. A method as recited in claim 1, a priority level one level below a highest priority level of multiple priority levels having been assigned to groups of data accessed when hibernating a computing device.

8. A method as recited in claim 1, a particular priority level of the multiple priority levels having been assigned to groups of data accessed when pages of memory are swapped out of volatile memory of a computing device to the hybrid drive.

9. A method as recited in claim 1, a particular priority level of multiple priority levels having been assigned to groups of data accessed when hibernating a computing device in response to a request to shut down the computing device.

10. A method as recited in claim 1, the hybrid drive operating when booting a computing device, until a request to cease operating in a boot pinning mode is received from the computing device, as if each group of data accessed were assigned a highest priority level of multiple priority levels.

11. A method as recited in claim 1, the group of data having been assigned a lower priority level if the group of data is part of a sequential I/O access accessed during a beginning of the sequential I/O access than if the group of data is part of a random I/O access, and otherwise the group of data having been assigned a same priority level as if the group of data were part of a random I/O access.

12. A method as recited in claim 1, the group of data having been assigned a lower priority level if the group of data is part of a first type of access than if the group of data is part of a second type of access, and the lower priority level having been assigned only if the performance part has access characteristics for the first type of access that are approximately the same as or worse than access characteristics of the base part for the first type of access, but the performance part also has access characteristics for the second type of access that are better than access characteristics of the base part for the second type of access.

13. A computer-readable storage media having stored thereon multiple instructions that, responsive to execution by one or more processors of a computing device, cause the one or more processors to perform operations comprising:
obtaining information describing accesses to multiple groups of data stored in a hybrid drive, the hybrid drive including both a performance part and a base part in which the groups of data can be stored; and
communicating, with an input/output (I/O) command issued to the hybrid drive, an indication of a priority level of a group of data accessed by the I/O command, the priority level indicating to the hybrid drive whether the hybrid drive is expected to store the group of data in the performance part, the priority level having been assigned to the group of data based on the information.

14. A computer-readable storage media as recited in claim 13, the priority level of one or more of the multiple groups of data changing over time.

15. A computer-readable storage media as recited in claim 13, the information describing accesses to multiple groups of data including information identifying groups of data that are accessed when the computing device is going into or coming out of a standby mode, a particular priority level of multiple priority levels having been assigned to groups of data accessed when the computing device is going into or coming out of a standby mode.

16. A computer-readable storage media as recited in claim 13, the priority level indicating to the hybrid drive whether the hybrid drive is expected to store the group of data in the performance part although the hybrid drive is not bound to storing the group of data in the performance part.

17. A computing device comprising:
one or more processors; and
one or more computer-readable media having stored thereon multiple instructions that, when executed by the one or more processors, cause the one or more processors to:
obtain information describing accesses to multiple groups of data stored in a hybrid drive, the hybrid drive including both a performance part and a base part in which the groups of data can be stored, and
communicate, with an input/output (I/O) command issued from an operating system to the hybrid drive, an indication of a priority level of a group of data accessed by the I/O command, the priority level providing an indication to the hybrid drive whether the hybrid drive is expected to store the group of data in the performance part but the operating system having no knowledge of whether the group of data is stored in the performance part, the priority level having been assigned to the group of data based on the information.

18. A computing device as recited in claim 17, a particular priority level of multiple priority levels having been assigned to groups of data accessed when pages of memory are swapped out of volatile memory of the computing device to the hybrid drive.

19. A computing device as recited in claim 17, the hybrid drive operating when booting the computing device, until a request to cease operating in a boot pinning mode is received from the computing device, as if each group of data accessed were assigned a highest priority level of multiple priority levels.

20. A computing device as recited in claim 17, the information describing accesses to multiple groups of data including information identifying groups of data that are accessed when the computing device is going into or coming out of a standby mode, a particular priority level of multiple priority levels having been assigned to groups of data accessed when the computing device is going into or coming out of a standby mode.

* * * * *